United States Patent [19]

Kumada et al.

[11] Patent Number: 5,671,021
[45] Date of Patent: Sep. 23, 1997

[54] IMAGE MONITORING APPARATUS HAVING A COMMON INTERFACE FOR COMMANDS AND INPUT SIGNALS AND MONITOR DRIVER THEREFOR

[75] Inventors: Shuichi Kumada; Toshihisa Okutsu, both of Yokohama, Japan

[73] Assignee: Canon Kabushiki Kaisha, Tokyo, Japan

[21] Appl. No.: 400,517

[22] Filed: Mar. 7, 1995

Related U.S. Application Data

[63] Continuation of Ser. No. 22,170, Feb. 25, 1993, abandoned.

[30] Foreign Application Priority Data

Feb. 27, 1992 [JP] Japan ................................. 4-041077

[51] Int. Cl.$^6$ ................................. H04N 9/73; G09G 1/02
[52] U.S. Cl. ................................. 348/644; 345/10; 345/22; 345/112; 345/145; 345/204; 345/212
[58] Field of Search ................................. 345/12, 10, 124, 345/213, 22, 132, 212, 204, 150, 145; 348/460, 605, 645, 646, 647, 650, 649, 651, 655, 671, 673, 675, 678, 687, 674; 359/518, 519; H04N 9/73

[56] References Cited

U.S. PATENT DOCUMENTS

| | | | |
|---|---|---|---|
| 4,799,106 | 1/1989 | More et al. | 345/674 X |
| 4,805,013 | 2/1989 | Dei et al. | 358/80 |
| 4,864,391 | 9/1989 | Taguchi | 358/518 |
| 4,962,418 | 10/1990 | Kamaga | 358/29 |
| 5,111,281 | 5/1992 | Sekiguchi | 358/29 |
| 5,408,342 | 4/1995 | Kumada et al. | 358/518 |
| 5,457,473 | 10/1995 | Arai et al. | 345/212 |

*Primary Examiner*—John K. Peng
*Assistant Examiner*—Nathan J. Flynn
*Attorney, Agent, or Firm*—Fitzpatrick, Cella, Harper & Scinto

[57] ABSTRACT

A color image monitoring apparatus is capable of controlling the color correction characteristics by external commands. A color correction information memory stores input masking coefficients and $\gamma$ correction tables. The input masking coefficients can be loaded in the memory by an external command. In the $\gamma$ correction tables includes a table for the correction values for the $\gamma$ values at pitches of 0.1 within a range of 1.0 to $\alpha$ (>1.0). When a $\gamma$ correction process is executed, the tables to be used are selected by specifying the $\gamma$ values by the external command. A color correction circuit performs the respective $\gamma$ correction and input masking processes using the $\gamma$ correction tables and input masking coefficients stored in the memory.

10 Claims, 7 Drawing Sheets

$$Y = K \times \left(\frac{X}{K}\right)^\gamma$$

X : INPUT RGB VALUE (BEFORE GAMMA CORRECTION)
Y : OUTPUT RGB VALUE (AFTER GAMMA CORRECTION)
$\gamma$ : GAMMA VALUE
　　WHEN NO CORRECTION, $\gamma = 1.0$
K : CONSTANT (WHEN 8 BITS, 225.0)

FIG. 3

$$\begin{bmatrix} Rout \\ Gout \\ Bout \end{bmatrix} = \begin{bmatrix} a11 & a12 & a13 \\ a21 & a22 & a23 \\ a31 & a32 & a33 \end{bmatrix} \begin{bmatrix} Rin \\ Gin \\ Bin \end{bmatrix}$$

FIG. 4

| COMMAND NUMBER | γ-VALUE |
|---|---|

FIG. 5

| COMMAND NUMBER | a11 | a12 | a13 | a21 | a22 | a23 | a31 | a32 | a33 |
|---|---|---|---|---|---|---|---|---|---|

FIG. 6

| |
|---|
| → HEAD ADDRESS OF TABLE #2 OF γ=1.0 |
| HEAD ADDRESS OF TABLE #2 OF γ=1.1 |
| HEAD ADDRESS OF TABLE #2 OF γ=1.2 |
| ⋮ |
| HEAD ADDRESS OF TABLE #2 OF γ=α |

FIG. 7

| |
|---|
| → CORRECTION VALUE FOR 0 |
| CORRECTION VALUE FOR 1 |
| CORRECTION VALUE FOR 2 |
| ⋮ |
| CORRECTION VALUE FOR 254 |
| CORRECTION VALUE FOR 255 |

IMAGE MONITORING APPARATUS HAVING A COMMON INTERFACE FOR COMMANDS AND INPUT SIGNALS AND MONITOR DRIVER THEREFOR

This application is a continuation of application Ser. No. 08/022,170 filed Feb. 25, 1993, now abandoned.

BACKGROUND OF THE INVENTION

1. Field of the Invention

The present invention relates to an image monitoring apparatus and a monitor driver.

2. Related Background Art

Figure 2:
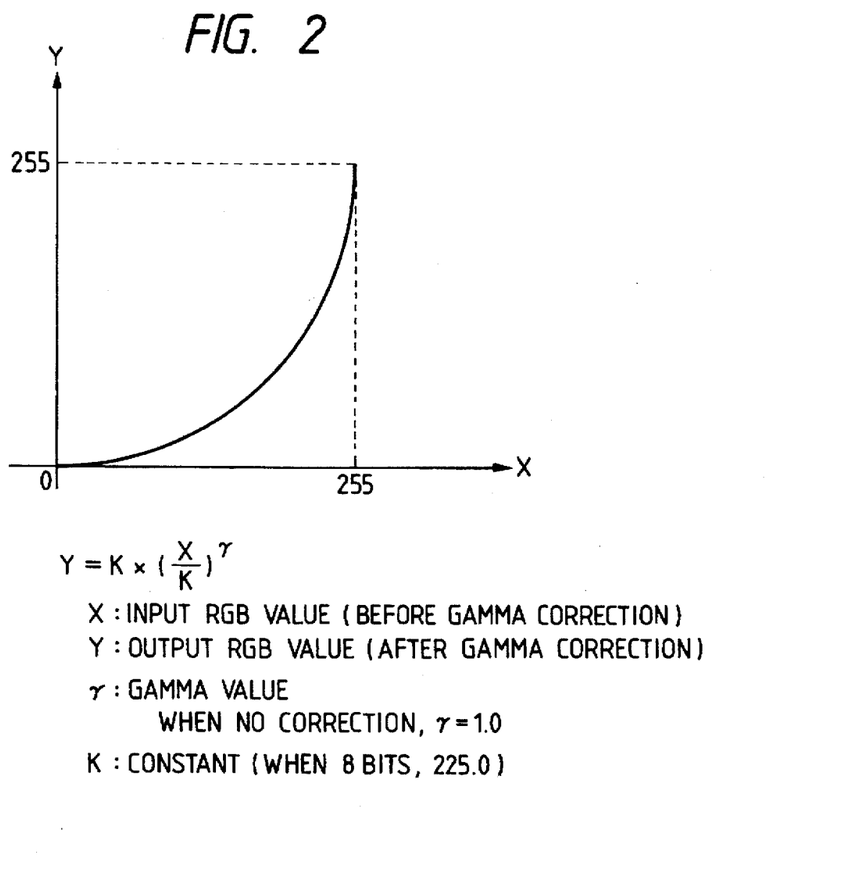
FIG. 2 is a view showing the characteristics of a gamma correction.

In an image monitoring apparatus for displaying an image, there is provided a gamma correction circuit to perform gamma corrections in accordance with the gamma characteristics of the image displaying elements (CRT (cold cathode ray tube), liquid crystal display element, plasma display, and the like). The aforesaid gamma correction circuit outputs a signal γ times an input signal (where γ is 1 or more). FIG. 2 is a view showing the gamma correction characteristics. The color appearance of an original image changes by correcting its RGB signals.

Figure 3:
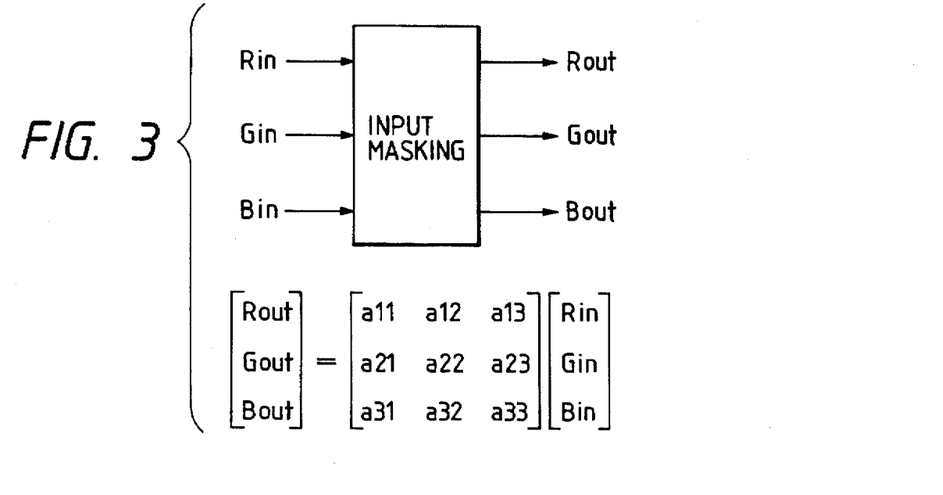
FIG. 3 represents the operational expressions for an input masking process.

Also, it is necessary to match the image signals with the color specification characteristics of an image displaying elements because each color specification capability of the R, G, and B colors is different depending on the fluorescent substances or luminescent substances to be used. Therefore, an input masking process is executed as shown in FIG. 3 by an input masking circuit. The conversion matrix {aij} of the input masking process is determined by the measurement results of the color specification capability of the image displaying elements by a spectrocolorimeter or the like.

In a conventional image monitoring apparatus, the gamma value of the above-mentioned gamma correction, and the conversion coefficient {aij} of the input masking process, namely, the color corrections, are slightly adjustable by a color adjustment volume.

However, there are many kinds of image sources available in recent years, while there are many kinds of image monitoring apparatuses available for the above-mentioned use. It is not easy to obtain a desirable image representation by an arbitrary combination of these image sources and monitoring apparatuses by making adjustments with the color adjustment volume of the image monitoring apparatus each time these are connected.

SUMMARY OF THE INVENTION

It is an object of the present invention to provide an image monitor and a monitor driver in which the above-mentioned problems have been solved.

It is another object of the present invention to enable colors represented by an image monitor to be adjusted to desired colors with a simple structure.

It is still another object of the present invention to provide an image monitor and a monitor driver capable of implementing a desirable color reproduction irrespective of the kinds of the image monitoring apparatuses.

In order to achieve these objects, there are provided the following means according to the present invention for an image monitoring apparatus which receives given commands and input color signals:

correcting means to correct input color signals in accordance with given correction parameters; and parameter setting means to select the color correction parameters to be used for the correcting means in accordance with the given commands.

These and other objects, and features of the present invention will become more apparent with reference to the embodiments set forth below and the accompanying drawings.

DETAILED DESCRIPTION OF THE PREFERRED EMBODIMENTS

Hereinafter, with reference to the accompanying drawings, the description will be made of an embodiment according to the present invention.

Figure 1:
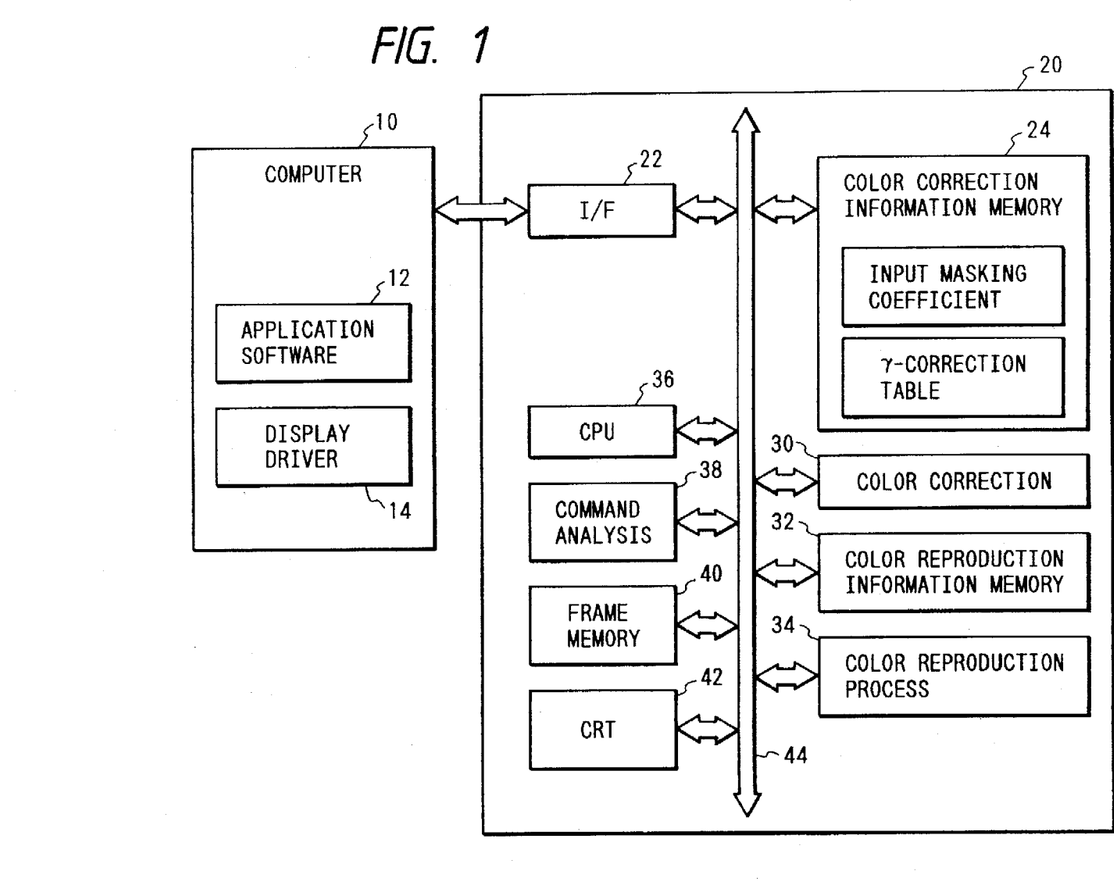
FIG. 1 is a block diagram showing the structure of an embodiment according to the present invention.

FIG. 1 is a view showing an embodiment of the present invention wherein a monitoring apparatus is connected to a computer. A reference numeral 10 designates a computer and 20, an image monitoring apparatus according to the present embodiment. In this respect, according to the present embodiment, the image data which are supplied from the computer 10 to the image monitoring apparatus 20 are assumed to be of an RGB type each having eight bits.

In the computer 10, there are stored in its main storage or an auxiliary storage device, an application software 12 and a display driver software 14 which suitably executable for an image monitoring apparatus 20 connected thereto.

In the image monitoring apparatus 20, a reference numeral 22 designates an interface which receives image data and commands from the computer 10; 24, a color correction information memory to store the input masking coefficients and γ correction tables; 30, a color correction circuit to chromatically correct the inputted image using the input masking coefficients and γ correction tables stored in the color correction information memory 24; 32, a color reproduction information memory to store the color reproduction information; and 34, a color reproduction processing circuit to reproduce colors using the color reproduction information to be stored in the color reproduction information memory 32. A reference numeral 36 designates a CPU comprising a microcomputer, ROM and RAM to execute overall controls; 38, a command analyzing circuit; 40, a frame memory; 42, a CRT, and 44, a data bus to connect each of the above-mentioned circuits interrelatedly.

Figure 4:
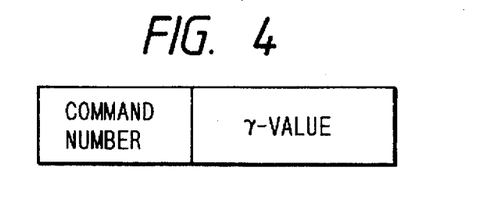
FIG. 4 represents the formula for a gamma correction command.

FIG. 4 is a view showing the formula for the gamma correction command which is transferred from the computer 10 to the image monitoring apparatus 20. The formula consists of a command number to indicate that it is a gamma correction command and gamma values.

Figure 5:
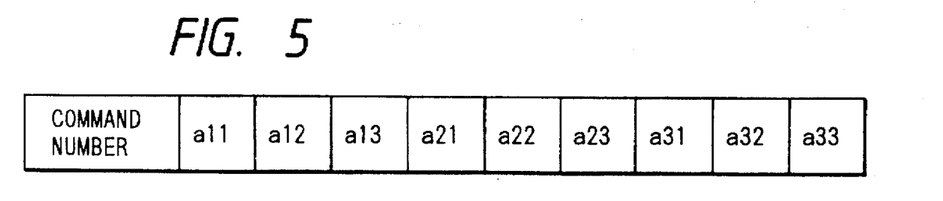
FIG. 5 represents the formula for an input masking coefficient set up command.

FIG. 5 is a view showing the formula for the input masking coefficient set up command which is transferred from the computer 10 to the image monitoring apparatus 20. The formula consists of a command number to indicate that it is an input masking coefficient set up command and input masking coefficients aij (i, j=1 to 3).

Figure 6:
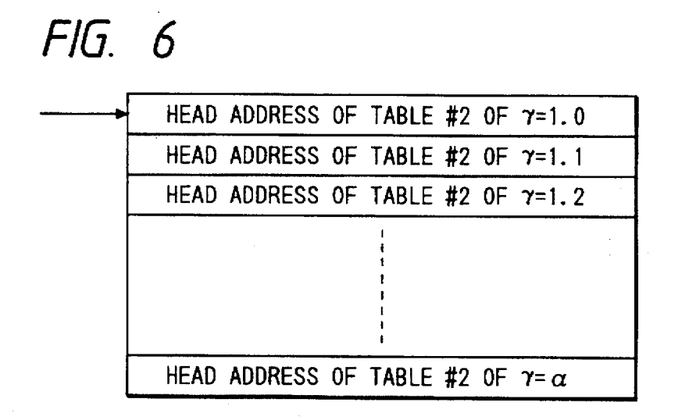
FIG. 6 is a view showing the structure of a gamma correction table #1.
Figure 7:
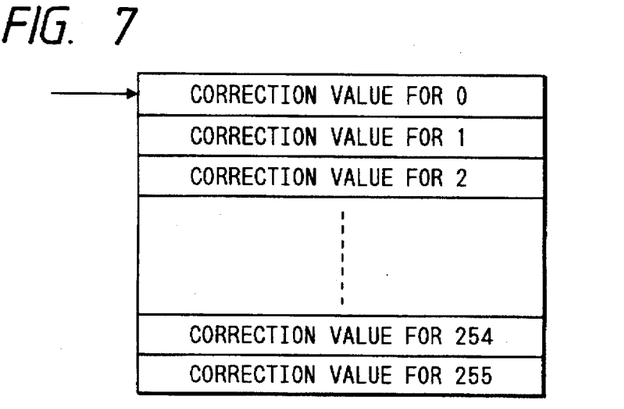
FIG. 7 is a view showing the structure of a gamma correction table #2.

In the present embodiment, two kinds of gamma table #1 and #2 are stored in the memory 24. In the second gamma table #2, the correction values (converted values) are stored respectively for the inputted values 0 to 255 (in a case of eight bits) at pitches of 0.1 within a range of γ=1.0 to α (>1.0). In the first gamma correction table #1, the head addresses of the second gamma correction table #2 for each of the gamma values are stored. FIG. 6 illustrates the structure of the first gamma correction table #1. FIG. 7 illustrates the structure of the second gamma correction table #2.

Figure 8:
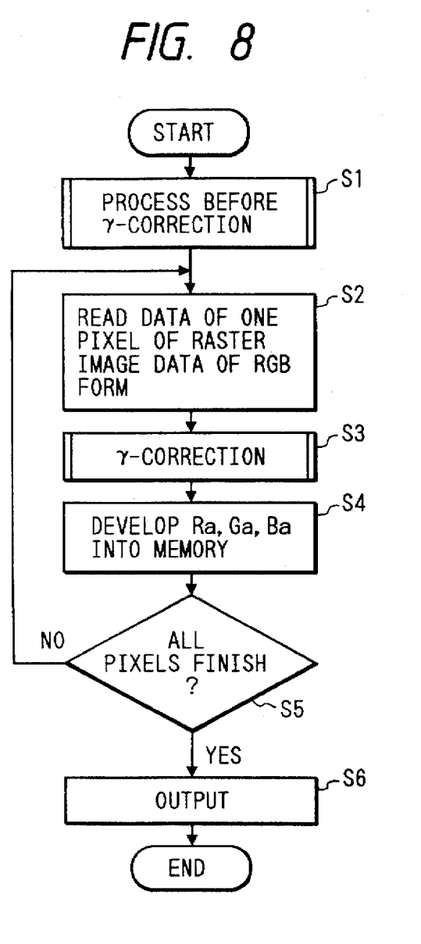
FIG. 8 is the main flowchart for the gamma correction.
Figure 9:
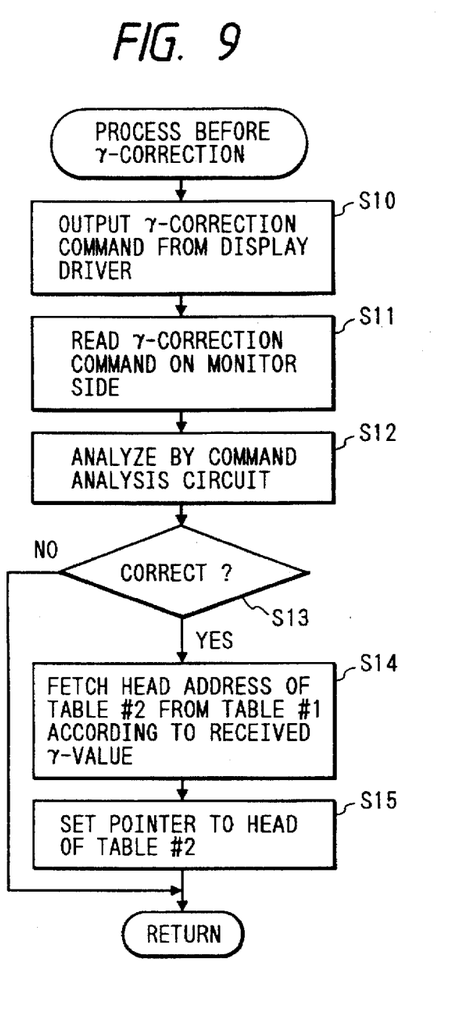
FIG. 9 is a detailed flowchart for a gamma correction preparatory process (S1) shown in FIG. 8.

FIG. 8 is a flowchart showing an operation when only the gamma correction is executed. At first, a gamma correction preparatory process is performed (S1). FIG. 9 is the detailed flowchart showing the gamma correction preparatory process (S1). A display driver of the computer 10 outputs the gamma correction command shown in FIG. 4 (S10). Then, the interface 22 of the image monitoring apparatus 20 reads such gamma correction command (S11). The received command is analyzed by a command analyzing circuit 38. If the command is found to be an incorrect gamma correction command (S13), such as its γ value being beyond the given range, the process will be terminated. If it is found to be a correct gamma correction command (S13), the γ value (see FIG. 4) subsequent to the command number is referred to the table #1 of the γ correction tables (memory 24) in order to fetch the head address of the table #2 (S14). Thus, the pointer is set at the head address of the table #2 (S15).

Figure 10:
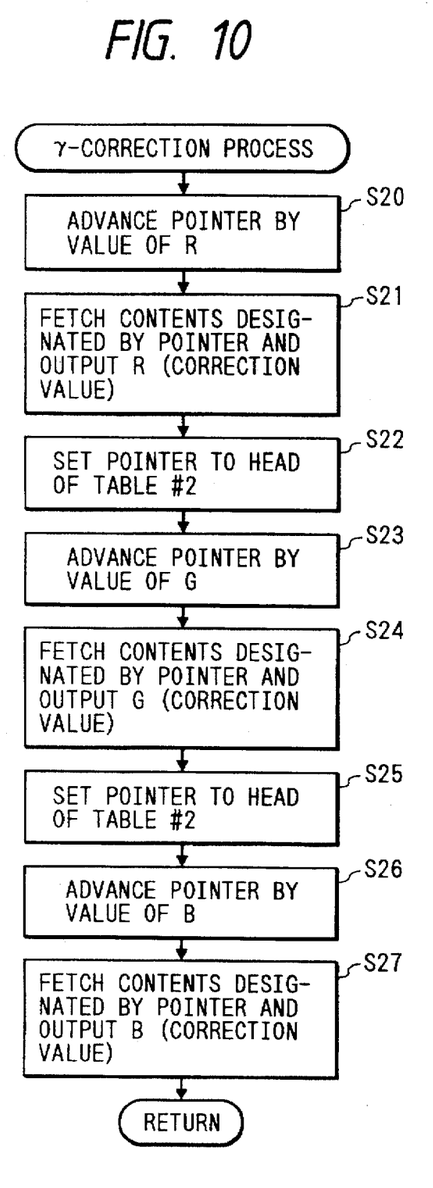
FIG. 10 is a detailed flowchart for a gamma correction process (S3) shown in FIG. 8.

Subsequent to the gamma correction command, luster image data are transferred from the computer 10 to the image monitoring apparatus 20 in the form of RGB. After the termination of the γ correction preparatory process (S1), the color correction circuit 30 reads one pixel of the RGB type luster image data from the data bus 44 (S2) to execute a gamma correction process (S3). FIG. 10 shows the details of the gamma correction process.

In FIG. 10, the pointer is caused to advance by the value of R (S20) to read the contents indicated by the pointer on the table #2 (S21). This will be the correction value Ra of the R. The pointer is returned to the head address of the table #2 (S22) to cause it to advance by the value of G (S23); thus reading the contents indicated by the pointer on the table #2 (S24). This will be the correction value Ga of the G. Again, the pointer is returned to the head address of the table #2 (S25). The pointer is caused to advance by the value of B (S26) to read the contents indicated by the pointer on the table #2 (S27). This will be the correction value Ba of the B.

The correction values Ra, Ga, and Ba thus obtained by the gamma correction process (S3) are stored in the frame memory 40 (S4). S2 to S4 are executed for all the pixels (S5). When the gamma corrections are given to the entire pixels (S5), the image data stored in the memory 40 are supplied to the CRT 42 to display a color image (S6).

Figure 11:
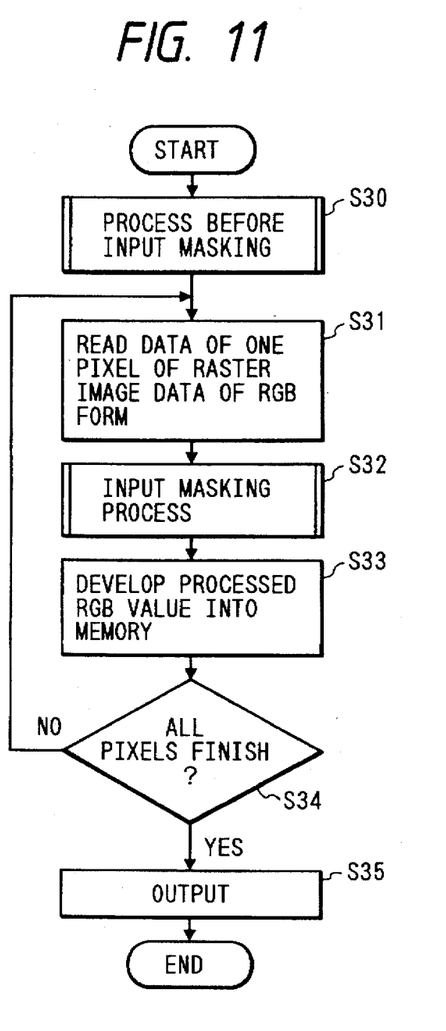
FIG. 11 is the main flowchart for an input masking process.
Figure 12:
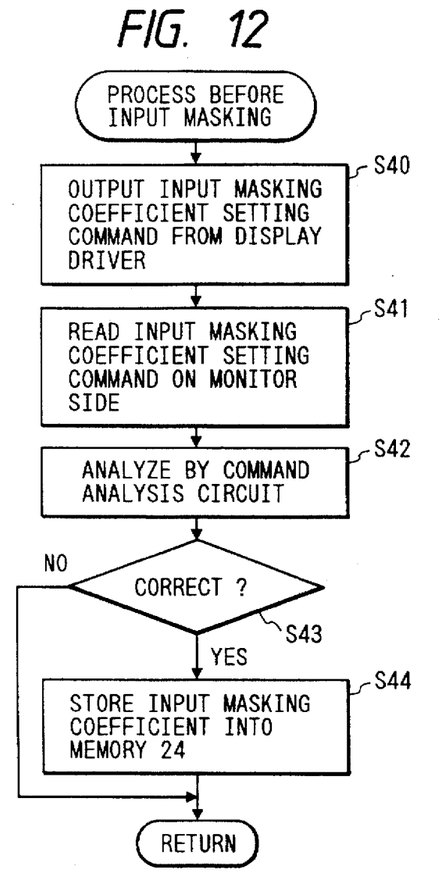
FIG. 12 is a detailed flowchart for an input masking preparatory process (S30) shown in FIG. 11.

FIG. 11 is a flowchart showing an operation when only the input masking process is executed. At first, an input masking preparatory process is performed (S30). FIG. 12 shows the detailed flowchart for the input masking preparatory process (S30). The display driver of the computer 10 outputs the input masking coefficient set up command shown in FIG. 5 (S40). The interface 22 of the image monitoring apparatus 20 reads the input masking coefficient set up command (S41). The received command is analyzed by the command analyzing circuit 38. If it is found to be an incorrect input masking coefficient set up command (S43), such as the parameter values being beyond the given range, the process will be terminated. If it is found to be a correct input masking coefficient set up command (S43), the parameters (see FIG. 5) subsequent to the command number are stored in the input masking coefficient storing area of the color correction information memory 24 (S44).

Figure 13:
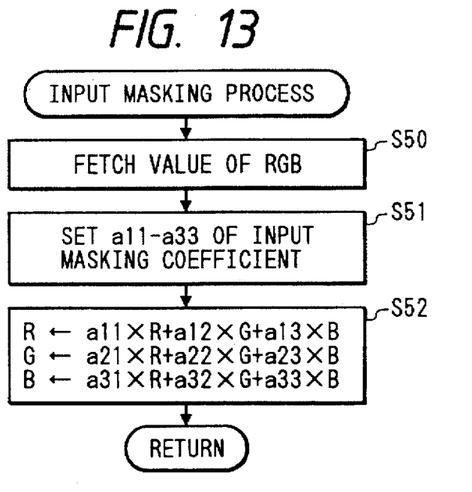
FIG. 13 is a detailed flowchart for an input masking process (S32) shown in FIG. 11.

Subsequent to the input masking coefficient set up command, luster image data are transferred from the computer 10 to the image monitoring apparatus 20 in the form a of RGB. After the termination of the preparatory process (S30), the color correction circuit 30 reads one pixel data of the RGB type luster image data from the data bus 44 (S31) to execute the input masking process (S32). FIG. 13 illustrates the details of the input masking process.

In FIG. 13, the RGB values are fetched (S50). The input masking coefficients aij (i, j=1 to 3) stored in the memory 24 are set (S51). Then, the masking operation shown in FIG. 3 is executed (S52).

The RGB values Rb, Gb, and Bb obtained by the input masking process (S32) are stored in the frame memory 40 (S33). S31 to S33 are executed for the entire pixels (S34). When the input masking processes are given to the entire pixels (S34), the image data stored in the memory 40 are supplied to the CRT 42 thereby to display a color image (S35).

In the flowcharts shown in FIG. 8 to FIG. 13, the gamma correction and the input masking process are executed separately. It is of course possible to execute them together. Expressing it in terms of an equivalent circuit, such will be as shown in FIG. 14, and its flowchart will be as shown in FIG. 15.

Figure 15:
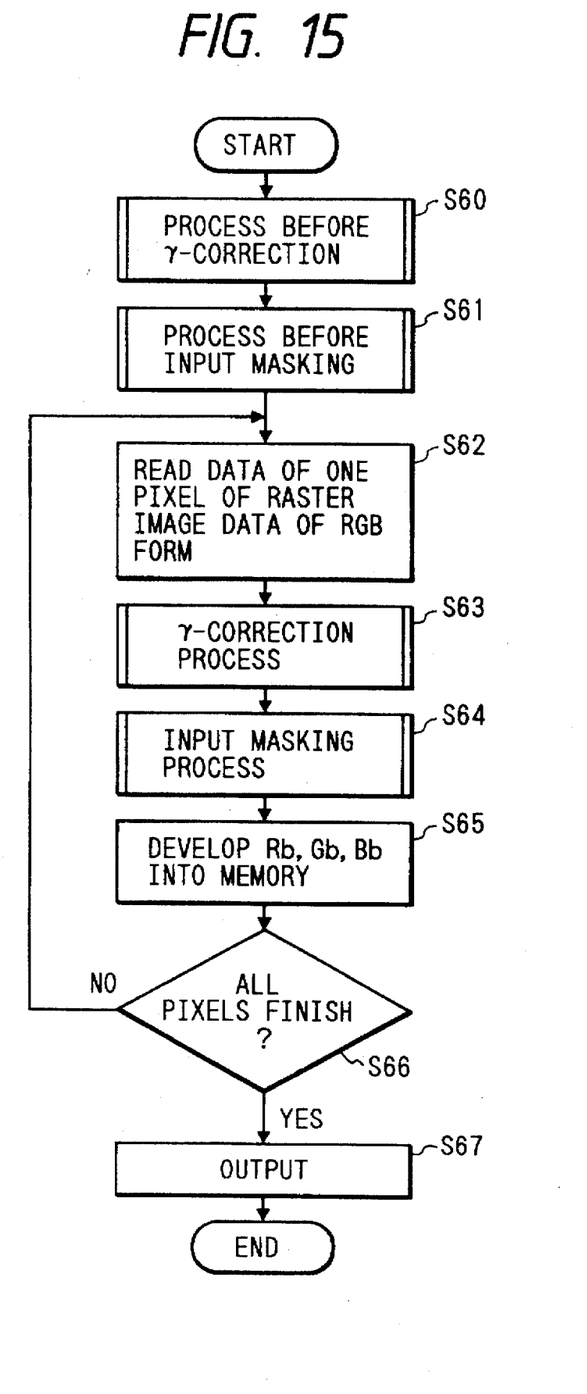
FIG. 15 is the main flowchart showing the input masking process to be executed after the gamma correction.

Here, FIG. 15 is described. At first, the gamma correction preparatory process shown in FIG. 9 is executed (S60). The input masking preparatory process shown in FIG. 12 is executed (S61). Subsequently, the color correction circuit 30 reads one pixel of the RGB type luster image data transferred from the computer 10 (S62) to execute a gamma correction process shown in FIG. 10 (S63). Then, with the corrected values by the gamma correction process, an input masking process will be executed as shown in FIG. 13 (S64).

The RGB values Rb, Gb, and Bb obtained by the input masking process (S64) are stored in the frame memory 40 (S65). S62 to S65 are executed for the entire pixels (S66). When the gamma correction and input masking processes are given to the entire pixels (S66), the image data stored in the memory 40 are supplied to the CRT 42 thereby to display a color image (S67).

Figure 14:
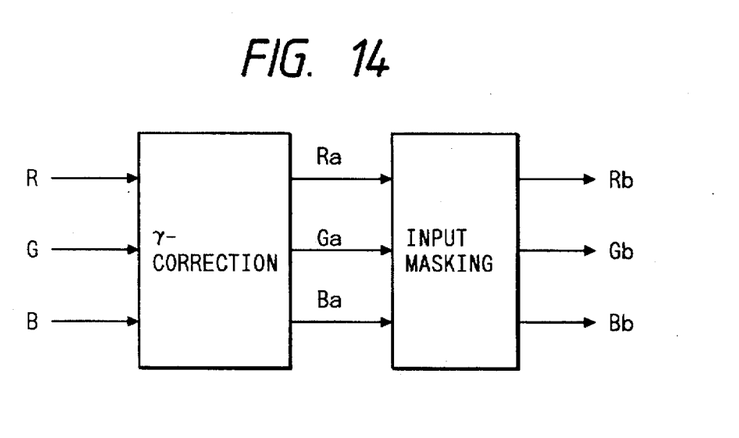
FIG. 14 is a view showing an equivalent circuit for the input masking process subsequent to the gamma correction.

According to the present embodiments shown in FIG. 14 and FIG. 15, the input masking process is performed after the gamma correction has been executed. However, these can be executed reversely. Also, as the masking coefficients, it may be possible to adopt either linear type or non-linear type coefficients. The process on the monitor side can be performed either by the use of hardware or by the application of software.

As readily understandable from the above description, it is possible to control the color correction capability by the use of external commands according to the present embodiment. Accordingly, it is possible to externally control the gamma corrections and input masking processes; hence making the adjustment operation easy.

It is to be understood that the present invention is not limited to the embodiments set forth above, and that further modifications are possible within the scope of the following claims.

What is claimed is:

1. An image monitoring apparatus for displaying color images, comprising:

an interface for receiving both commands and color signals from a monitor driver in an external apparatus;

correcting means for correcting said color signals received over said interface, said correcting means correcting the color signals in accordance with a color correction parameter;

parameter setting means for setting said color correction parameter to be used by said correcting means to correct the color signals, said parameter setting means setting the color correction parameter in accordance with said commands received over said interface; and displaying means for displaying a visible color image based on a color signal corrected by said correcting means.

2. An image monitoring apparatus according to claim 1, wherein said correcting means performs plural types of color corrections.

3. An image monitoring apparatus according to claim 1, wherein said correcting means performs gamma corrections.

4. An image monitoring apparatus according to claim 1, further comprising:

a memory connected to said correcting means to store the corrected color signals as a frame of image data.

5. An image monitoring apparatus according to claim 4, further comprising:

a monitor connected to said memory to reproduce as a visible image said corrected color signals stored in said memory.

6. A method for controlling an image monitoring apparatus which receives commands and color signals from a monitor driver in an external apparatus, comprising the steps of:

receiving the commands and the color signals from the monitor driver over an interface;

correcting the color signals received over the interface, the correcting step correcting the color signals in accordance with a color correction parameter;

setting the color correction parameter to be used in the correcting step to correct the color signals, the parameter setting step setting the color correction parameter in accordance with the commands received over the interface; and displaying a visible color image based on a color signal corrected in the correcting step.

7. A method for controlling an image monitoring apparatus according to claim 6, wherein said commands include a command for performing gamma corrections.

8. A method for controlling an image monitoring apparatus according to claim 6, wherein said commands include a command for performing masking processes.

9. An apparatus according to claim 1, wherein the interface comprises a bidirectional communication line;

wherein said apparatus further comprises discriminating means for discriminating whether the commands are valid; and wherein, when the discriminating means determines that the commands are invalid, said apparatus notifies the monitor driver, over the bidirectional communication line, that the commands are invalid.

10. A method according to claim 6, wherein the interface comprises a bidirectional communication line;

wherein the method further comprises a discriminating step for discriminating whether the commands are valid; and wherein, when the discriminating step determines that the commands are invalid, the method includes a step of notifying the monitor driver, over the bidirectional communication line, that the commands are invalid.

* * * * *

UNITED STATES PATENT AND TRADEMARK OFFICE
CERTIFICATE OF CORRECTION

PATENT NO. : 5,671,021

DATED : September 23, 1997

INVENTORS : Shuichi Kumada, et al.

It is certified that error appears in the above-identified patent and that said Letters Patent is hereby corrected as shown below:

<u>REFERENCES CITED</u> ON THE TITLE PAGE ITEM [56],

U.S. PATENT DOCUMENTS

"More et al." should read --Moore et al.--.

Signed and Sealed this

Fourteenth Day of April, 1998

Attest:

BRUCE LEHMAN

Attesting Officer
Commissioner of Patents and Trademarks